US006987870B2

(12) United States Patent
Harney et al.

(10) Patent No.: US 6,987,870 B2
(45) Date of Patent: Jan. 17, 2006

(54) SYSTEM AND METHOD FOR SELECTING A DESTINATION PROFILE USING BIOMETRICS

(75) Inventors: Wanda M. Harney, Cypress, CA (US); Guy Eden, Tustin, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 525 days.

(21) Appl. No.: 10/099,048

(22) Filed: Mar. 15, 2002

(65) Prior Publication Data

US 2003/0174867 A1    Sep. 18, 2003

(51) Int. Cl.
*G06K 9/00* (2006.01)
(52) U.S. Cl. ............... 382/115; 382/116; 382/117; 382/118; 382/124; 340/5.53; 340/5.83
(58) Field of Classification Search ............. 382/115, 382/116, 124–127; 340/5.53, 5.83
See application file for complete search history.

(56) References Cited

U.S. PATENT DOCUMENTS

| | | | |
|---|---|---|---|
| 5,659,613 A | 8/1997 | Copeland et al. | 380/202 |
| 5,960,100 A | 9/1999 | Hargrove | 382/124 |
| 6,814,293 B2 * | 11/2004 | Curry et al. | 235/472.01 |

FOREIGN PATENT DOCUMENTS

| | | |
|---|---|---|
| JP | 2001045192 | 7/1999 |
| JP | 2001265915 | 3/2000 |

OTHER PUBLICATIONS

Machine Translation of JP2001265915, Daisuke et al., Mar. 16, 2000.*

* cited by examiner

*Primary Examiner*—Bhavesh M. Mehta
*Assistant Examiner*—John Strege
(74) *Attorney, Agent, or Firm*—David C. Ripma

(57) ABSTRACT

A digital scanner system and method are provided for selecting a destination profile using personal identification data. The method comprises: supplying personal identification data; supplying a document; scanning the document; and, sending the scanned document to a destination selected in response to the personal identification data. The personal identification data can be biometric data such as retina images, voice audio, and fingerprints, or a smart card. The method typically comprises: establishing a network with a plurality of connecting destination addresses. Then, sending the scanned document includes sending the file of digital information via the network to a particular destination address. Some aspects additional comprise: creating a library where a plurality of biometric data items associated with a particular user, are cross-referenced to destination addresses; accessing the library; searching the library for biometric data matching the supplied biometric data; and, selecting the destination address corresponding to the matching biometric data.

25 Claims, 3 Drawing Sheets

LIBRARY 124

| DATA | DESTINATION |
|---|---|
| USER A, RIGHT INDEX FINGER | A |
| USER A, LEFT INDEX FINGER | B |
| USER A, RIGHT RETINA | C |
| USER A, LEFT RETINA | n |
| USER B, WORD "ONE" | D |
| USER B, WORD "TWO" | E |
| ⋮ | ⋮ |
| USER C, SMART CARD | Z |

SYSTEM AND METHOD FOR SELECTING A DESTINATION PROFILE USING BIOMETRICS

BACKGROUND OF THE INVENTION

1. Field of the Invention

This invention generally relates to network-connected digital scanners and, more particularly to a system and method for using personal identification data, such as biometrics, in the selection of scanned document destinations.

2. Description of the Related Art

There are many circumstances when the user of a digital scanner would want to send an ad-hoc scanned image to a frequently used destination. Digital scanner, as used herein, refers to a family of products such as scanners, copiers, fax machines, or multifunctional peripherals (MFPs) that record document images and represent the scanned document as a file(s) of digital information. From the file of digital information, the document is reproduced on paper, or transmitted via a digital or analog transmission means.

When that user walks up to such a scanner, they are conventionally faced with a menu that includes a plurality of profiles from which to choose. The user typically "pages down" the menu until the desired destination is found, and then the user selects the destination. This destination selection process is inconvenient and time consuming.

It would be advantageous if a user could instantly select a frequently used profile destination without reading any menus.

It would be advantageous if the above-mentioned instant selection process included an encryption means.

In mind of the above-mentioned ends it would be advantageous if a user's biometric data, such as a fingerprint, could be used to select a frequently used destination for a scanned document file.

SUMMARY OF THE INVENTION

The present invention makes it faster and easier to use digital scanners for the ad-hoc transmission of documents. The invention reduces the need for manual keying in the selection of profiles (destinations), prior to scanning documents. The invention provides a way for the user to stamp their finger on a scanning pad, for example, and in response, the scanner associates a destination from a plurality of destinations previously entered and stored in the scanner. The scanner associates the biometric data with the selected profile (destination), so that the user is not obliged to go over menus, or to page through destinations in order to find their favorite destination.

Accordingly, in a digital scanner, a method is provided for selecting a destination profile using personal identification data. The method comprises: supplying personal identification data; supplying a document; scanning the document; and, sending the scanned document to a destination selected in response to the personal identification data. The personal identification data can be biometric data such as retina images, voice audio, and fingerprints, or a smart card.

The method typically comprises: establishing a network with a plurality of connecting destination addresses. Then, sending the scanned document includes sending the file of digital information via the network to a particular destination address.

Some aspects additionally comprise: creating a library of biometric data cross-referenced to destination addresses; accessing the library; searching the library for biometric data matching the supplied biometric data; and, selecting the destination address corresponding to the matching biometric data. For example, creating a library of biometric data cross-referenced to destination addresses can include: creating a library with a plurality of fingerprints for a first user; and, cross-referencing each of the first user fingerprints to a different destination address. Additionally or alternately, the library can cross-reference a different destination for each of a user's retina scans (left and right eyes), or for different words a user may speak.

Additional details of the above-described method, and a scanner system for selecting a destination profile using personal identification data are provided below.

DETAILED DESCRIPTION OF THE PREFERRED EMBODIMENTS

Figures 1, 2:
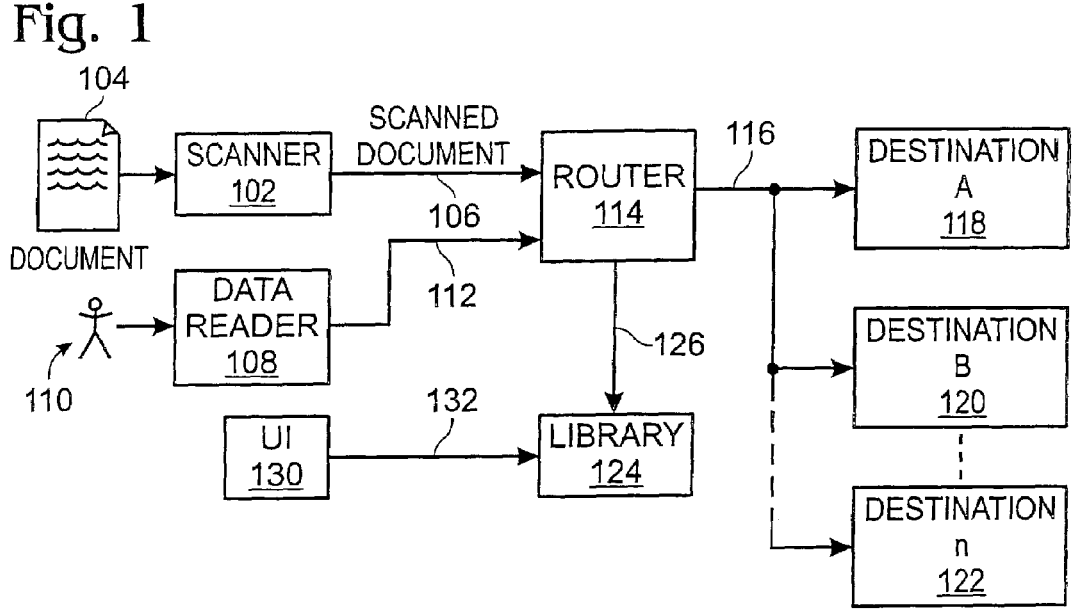
FIG. 1 is a schematic block diagram of the present invention scanner system for selecting a destination profile using personal identification data.
FIG. 2 is a schematic block diagram illustrating the library of FIG. 1 in greater detail.

FIG. 1 is a schematic block diagram of the present invention scanner system for selecting a destination profile using personal identification data. The system 100 comprises a scanner 102, as defined above, having an input to accept documents 104 and an output on line 106 to supply scanned documents. A data reader 108 has an input to accept personal identification data, represented by reference designator 110, and an output on line 112 to supply a digital representation of the personal identification data 110.

A router 114 has an input to accept the digital representation of the personal identification data on line 112 and an input to accept the scanned document on line 106. The router 114 analyzes the personal identification data and sends the scanned document, at an output on line 116, to a destination selected in response to the personal identification data.

In one aspect of the system 100, the data reader 108 is a biometric data reader such as a retina scanner, a microphone, or a fingerprint scanner. Then, the router 114 analyzes corresponding biometric data such as retina images, voice recognition, and fingerprints. Alternately, the data reader 108 is a smart card reader and the router 114 analyzes the data downloaded from the smart card memory.

As mentioned earlier, the scanner 102 records an image of the document 104 and converts the recorded image to digital information on line 106. The router 114 sends the scanned document as a file of digital information on line 116. Typically, the system 100 further comprises a network with a plurality of connecting destination addresses. The network is represented by line 116. The router 114 sends the files of digital information via the network 116 to a particular destination address. Shown are destination A (118), destination B (120), and destination n (122). The present invention system 100 is not limited to any particular number of destinations.

In some aspects of the system 100, the network 116 is an Internet network connected to a plurality of Internet Protocol (IP) addresses (at destinations 118/120/122). Alternately, the network 116 is an intranet network with connecting destinations differentiated by email, file transport protocol (FTP), or hypertext transport protocol (HTTP). The present invention system 100 is not limited to any particular network type.

The system 100 further comprises a library 124 of biometric data cross-referenced to destination addresses. The router 114 searches the library 124 for biometric data matching the supplied biometric data and selects the destination address corresponding to the matching biometric data.

The router accesses the library via line 126. In some aspects of the system 100, the library 124, scanner 102, data reader 108, and router 114 are part of a common machine and lines 106, 112, and 126 are internal to the machine. Alternately, any of the above-mentioned elements can be remotely located from the other elements, and linked to the other elements via machine external connections. In some aspects of the system 100 (not shown), these external connections are made via the network on line 116.

FIG. 2 is a schematic block diagram illustrating the library 124 of FIG. 1 in greater detail. In some aspects of the system, the library 124 includes a plurality of fingerprints for a user, where each of the user's fingerprints is cross-referenced to a different destination address. The first two entries in the library 124 are examples of cross-referencing destinations against user A's fingerprints.

In other aspects of the system, the library 124 includes a plurality of words in a user's voice, where each of the user's words is cross-referenced to a different destination address. Entries five and six of the library are examples of cross-referencing destinations against the voice recognition of user B uttering the words "one" or "two". In some aspects, the library includes a right eye retina image and a left eye retina image for a user, where each of the retina images is cross-referenced to a different destination address. The third and fourth entries in the library are examples of cross-referencing destinations against user A's right and left retina images.

Further, as shown by the last entry, destinations can be cross-referenced against the smart cards of particular users. As shown, destination Z is referenced by the smart card of user C. It should be understood, however, that the library need not include all the above-mentioned personal identification types. Likewise, the library may include other biometric and personal identification means that are not specifically mentioned, such as personal chemistry and visual feature analyzers.

Returning to FIG. 1, the system 100 may further comprise a user interface 130 to register a new destination addresses, for example a mouse, touchscreen, keypad, or a display/keypad combination of accessible addresses. Likewise, the biometric data reader 108 can accept biometric data for registration. Then, the user interface 130 can be used to create cross-references between the registered biometric data and the registered destination address. In this manner, a user can enter new destinations against biometric data, or edit current destinations to be cross-referenced against a different type of biometric data. The library 124 accepts the created cross-reference via line 132.

The biometric data reader 108 converts the registered biometric data into a file of digital information for entry into the library 124. As shown, the entry process is via the router 114. However, a direct connection (not shown) could be made between the data reader 108 and the library 124. The router 114 searches the library 124 by matching biometric data files of digital information.

FUNCTIONAL DESCRIPTION

A user would operate the present invention scanner system as follows:
1. User walks up to copier with document(s) to send;
2. User places their thumb (for example) on a special thumb print sensor;
3. Fingerprint is transformed to digital data, and associated with a profile (destination);
4. User places at least one page on the scanner causing it to be imaged;
5. Document is sent via electronic means to recipient.

Figure 3A:
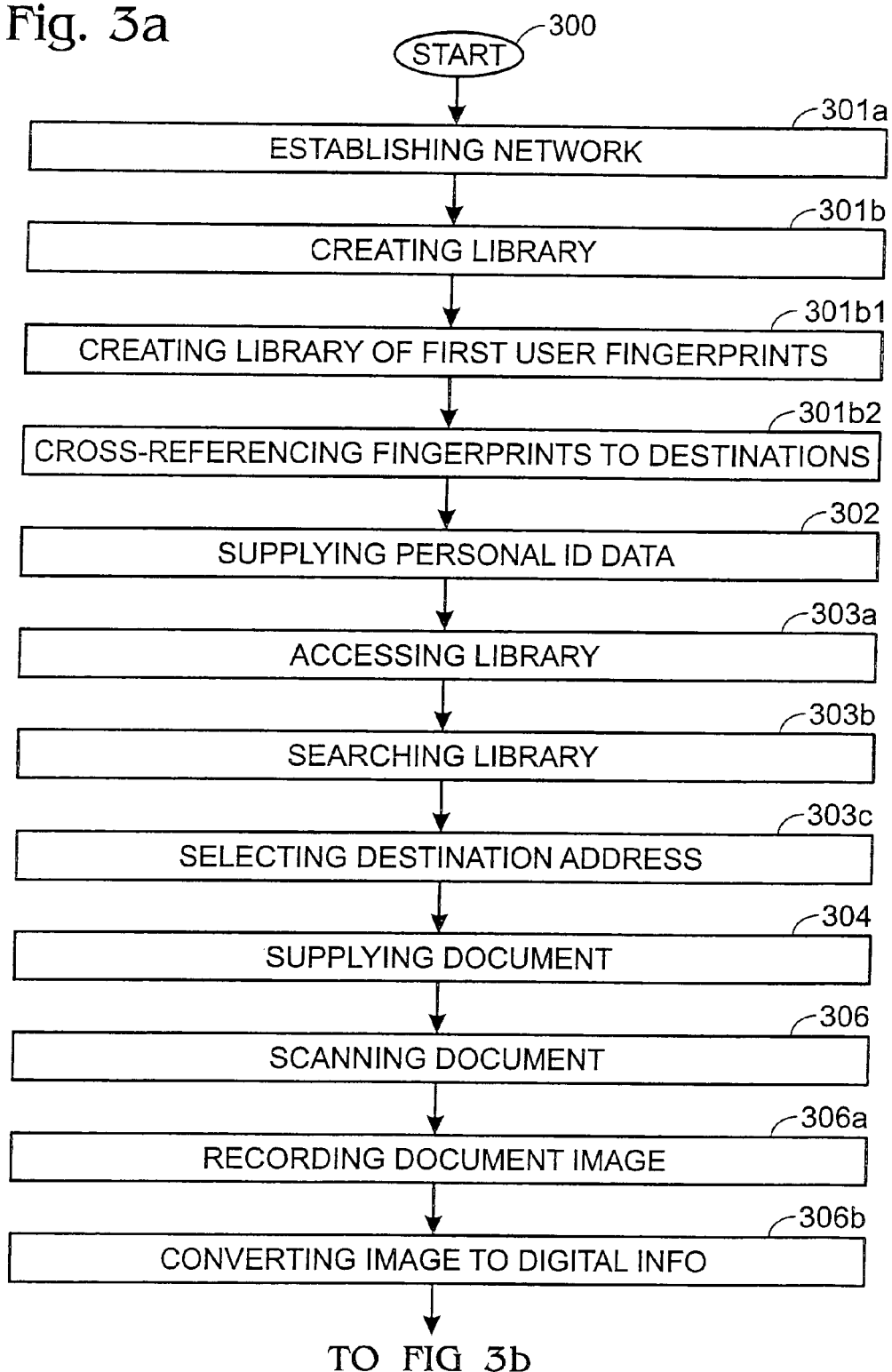
FIGS. 3a and 3b are flowcharts illustrating the present invention method for selecting a destination profile using personal identification data in a digital scanner.
Figure 3B:
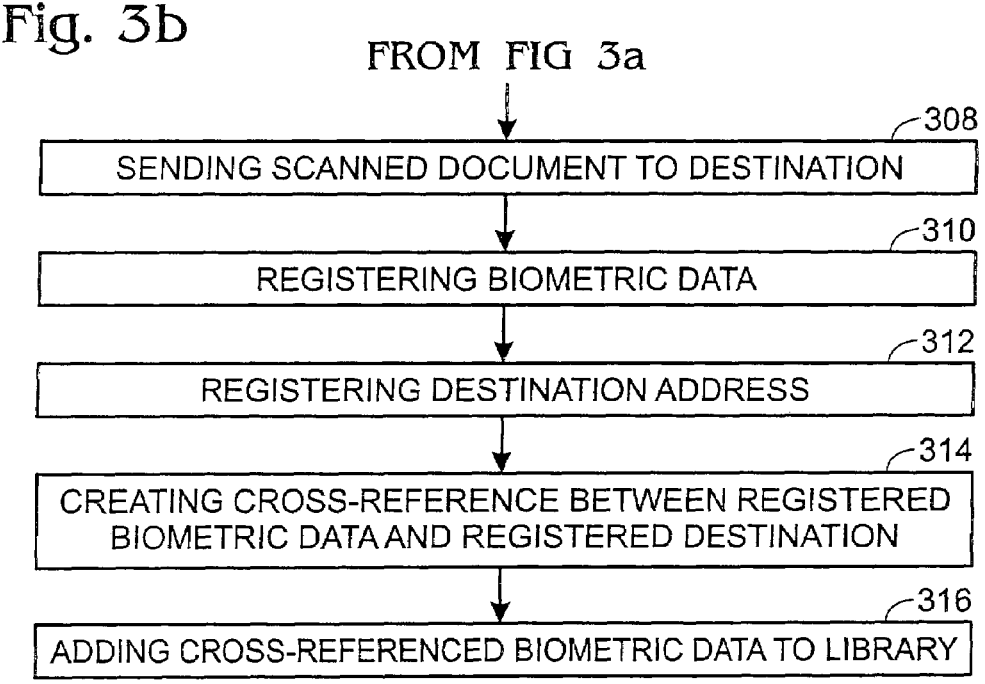

FIGS. 3a and 3b are flowcharts illustrating the present invention method for selecting a destination profile using personal identification data in a digital scanner. Although this method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 300. Step 302 supplies personal identification (ID) data. Step 304 supplies a document. Step 306 scans the document. Step 308 sends the scanned document to a destination selected in response to the personal identification data.

In one aspect of the method, supplying personal identification data in Step 302 includes supplying biometric data selected from the group including retina images, voice audio, and fingerprints. Alternately, Step 302 includes supplying a smart card.

In some aspects scanning the document in Step 306 includes substeps. Step 306a records an image of the document. Step 306b converts the recorded image to digital information. Then, sending the scanned document in Step 308 includes sending a file of digital information.

Some aspects of the method include a further step, Step 301a, of establishing a network with a plurality of connecting destination addresses. Then, sending the scanned document in Step 308 includes sending the file of digital information via the network to a particular destination address.

In some aspects of the method, establishing a network with a plurality of connecting destination addresses in Step 301a includes establishing an Internet network with a plurality of Internet Protocol (IP) addresses. Alternately, establishing a network with a plurality of connecting destination addresses includes establishing an intranet network with connecting destinations differentiated by email, file transport protocol (FTP), or hypertext transport protocol (HTTP).

Some aspects of the method include other steps. Step 301b creates a library of biometric data cross-referenced to destination addresses. Step 303a accesses the library. Step 303b searches the library for biometric data matching the supplied biometric data. Step 303c selects the destination address corresponding to the matching biometric data.

In some aspects, creating a library of biometric data cross-referenced to destination addresses in Step 301b includes substeps. Step 301b1 creates a library with a plurality of fingerprints for a first user. Step 301b2 cross-references each of the first user fingerprints to a different destination address. Alternately or additionally, creating a library of biometric data cross-referenced to destination addresses in Step 301b includes other substeps (not shown). Step 301b3 creates a library with a plurality of words in a first user's voice. Step 301b4 cross-references each of the first user words to a different destination address. Alternately or additionally, creating a library of biometric data cross-referenced to destination addresses in Step 301b includes other substeps (not shown). Step 301b5 creates a library with a right eye retina image and left eye retina image for a first user. Step 301b6 cross-references each of the first user retina images to a different destination address.

In some aspects, Step 310 registers biometric data or a smart card. Step 312 registers a destination address. Step 314 creates a cross-referencing between the registered biometric data (or smart card) and the registered destination address. Step 316 adds the cross-referenced biometric data to the library.

In other aspects, supplying biometric data in Step 302 includes converting the supplied biometric data into a file of digital information. Likewise, registering biometric data in Step 310 includes converting the registered biometric data into a file of digital information. Then, searching the library for biometric data matching the supplied biometric data in Step 303b includes matching biometric data files of digital information.

A system and method have been provided for using personal identification information in the selection of a destination for scanned documents. A few examples have been given of the kinds of biometric data that can be cross-references to destinations. However, the examples are not intended to be an exhaustive list of all possibilities. Examples have been given for the manipulation, storage, and accessing of biometric data. Again, the present invention has a broader application than merely the listed examples. Other variations and embodiments of the invention will occur to those skilled in the art.

We claim:

1. In a digital scanner, a method for selecting a destination profile using personal identification data, the method comprising:
   supplying personal identification data;
   supplying a document;
   scanning the document;
   accessing a library cross-referencing a plurality of biometric data items, associated with a first user, to a corresponding plurality of destination addresses;
   searching the library for biometric data matching the supplied biometric data;
   selecting the destination address corresponding to the matching biometric data; and,
   sending the scanned document to a destination selected in response to the personal identification data.

2. The method of claim 1 wherein supplying personal identification data includes supplying biometric data selected from the group including retina images, voice audio, and fingerprints.

3. The method of claim 1 wherein supplying personal identification includes supplying a smart card.

4. The method of claim 2 wherein scanning the document includes:
   recording an image of the document;
   converting the recorded image to digital information; and,
   wherein sending the scanned document includes sending a file of digital information.

5. The method of claim 4 further comprising:
   establishing a network with a plurality of connecting destination addresses; and,
   wherein sending the scanned document includes sending the file of digital information via the network to a particular destination address.

6. The method of claim 5 further comprising:
   creating the library of biometric data items cross-referenced to destination addresses.

7. The method of claim 6 wherein creating the library of biometric data items cross-referenced to destination addresses includes:
   creating a library with a plurality of fingerprints for the first user; and,
   cross-referencing each of the first user fingerprints to a different destination address.

8. The method of claim 6 wherein creating the library of biometric data items cross-referenced to destination addresses includes:
   creating a library with a plurality of words in a first user's voice; and,
   cross-referencing each of the first user words to a different destination address.

9. The method of claim 6 wherein creating the library of biometric data items cross-referenced to destination addresses includes:
   creating a library with a right eye retina image and left eye retina image for a first user; and,
   cross-referencing each of the first user retina images to a different destination address.

10. The method of claim 5 wherein establishing a network with a plurality of connecting destination addresses includes establishing an Internet network with a plurality of Internet Protocol (IP) addresses.

11. The method of claim 5 wherein establishing a network with a plurality of connecting destination addresses includes establishing an intranet network with connecting destinations differentiated by email, file transport protocol (FTP), and hypertext transport protocol (HTTP).

12. The method of claim 6 further comprising:
   registering biometric data;
   registering a destination address;
   creating a cross-referencing between the registered biometric data and the registered destination address; and,
   adding the cross-referenced biometric data to the library.

13. The method of claim 12 wherein supplying biometric data includes converting the supplied biometric data into a file of digital information;
   wherein registering biometric data includes converting the registered biometric data into a file of digital information; and,
   wherein searching the library for biometric data matching the supplied biometric data includes matching biometric data files of digital information.

14. A scanner system for selecting a destination profile using personal identification data, the system comprising:
   a scanner having an input to accept documents and an output to supply scanned documents;
   a data reader having an input to accept personal identification data and an output to supply a digital representation of the personal identification data;
   a library including a plurality of biometric data items, associated with a first user, cross-referenced to a corresponding plurality of destination addresses; and,
   a router having an input to accept the digital representation of the personal identification data, an input to accept the scanned document, the router searching the library for biometric data matching the supplied biometric data, selecting the destination address corresponding to the matching biometric data, and sending the scanned document, at an output, to the selected destination.

15. The system of claim 14 wherein the data reader is selected from the group of biometric data readers including a retina scanner, a microphone, and a fingerprint scanner; and, wherein the router analyzes biometric data selected from the group including retina images, voice recognition, and fingerprints.

16. The system of claim 14 wherein the data reader is a smart card reader; and, wherein the router analyzes data downloaded from the smart card memory.

17. The system of claim 15 wherein the scanner records an image of the document and converts the recorded image to digital information; and, wherein the router sends the scanned document as a file of digital information.

18. The system of claim 17 further comprising:

a network with a plurality of connecting destination addresses; and, wherein the router sends the files of digital information via the network to a particular destination address.

19. The system of claim 14 wherein the library includes a plurality of fingerprints for the first user, where each of the first user fingerprints is cross-referenced to a different destination address.

20. The system of claim 14 wherein the library includes a plurality of words in a first user's voice, where each of the first user words is cross-referenced to a different destination address.

21. The system of claim 14 wherein the library includes a right eye retina image and a left eye retina image for the first user, where each of the retina images is cross-referenced to a different destination address.

22. The system of claim 18 wherein the network is an Internet network connected to a plurality of Internet Protocol (IP) addresses.

23. The system of claim 18 wherein the network is an intranet network with connecting destinations differentiated as email, file transport protocol (FTP), and hypertext transport protocol (HTTP).

24. The system of claim 14 further comprising:

a user interface to register a new destination addresses;

wherein the biometric data reader accepts biometric data for registration;

wherein the user interface creates cross-references between the registered biometric data and the registered destination address; and, wherein the library accepts the created cross-reference.

25. The system of claim 24 wherein biometric data reader converts the registered biometric data into a file of digital information for entry into the library; and, wherein the router searches the library by matching biometric data files of digital information.

* * * * *